(12) United States Patent
Kwon

(10) Patent No.: US 8,922,082 B2
(45) Date of Patent: Dec. 30, 2014

(54) BLDC MOTOR FOR A HAIRDRYER

(75) Inventor: Hyuk Tae Kwon, Seoul (KR)

(73) Assignee: JMW Co., Ltd., Seoul (KR)

( * ) Notice: Subject to any disclaimer, the term of this patent is extended or adjusted under 35 U.S.C. 154(b) by 276 days.

(21) Appl. No.: 13/503,683

(22) PCT Filed: Mar. 15, 2010

(86) PCT No.: PCT/KR2010/001588
§ 371 (c)(1),
(2), (4) Date: Apr. 24, 2012

(87) PCT Pub. No.: WO2011/111895
PCT Pub. Date: Sep. 15, 2011

(65) Prior Publication Data
US 2012/0212087 A1    Aug. 23, 2012

(30) Foreign Application Priority Data
Mar. 11, 2010 (KR) .......... 10-2010-0021665

(51) Int. Cl.
| H02K 9/04 | (2006.01) |
| H02K 1/27 | (2006.01) |
| H02K 15/12 | (2006.01) |
| H02K 7/14 | (2006.01) |
| H02K 5/173 | (2006.01) |
| F04D 25/06 | (2006.01) |
| H02K 5/08 | (2006.01) |
| H02K 1/18 | (2006.01) |
| A45D 20/12 | (2006.01) |

(52) U.S. Cl.
CPC .............. *H02K 1/2786* (2013.01); *H02K 15/12* (2013.01); *H02K 7/14* (2013.01); *H02K 5/1735* (2013.01); *F04D 25/0606* (2013.01); *H02K 5/08* (2013.01); *H02K 1/187* (2013.01); *F04D 25/064* (2013.01); *F04D 25/0646* (2013.01); *F04D 25/062* (2013.01); *A45D 20/12* (2013.01)
USPC ............................................. 310/90; 310/91

(58) Field of Classification Search
CPC ... H05K 5/1675; H05K 5/1672; F16C 33/107
USPC ....................................................... 310/90, 91
See application file for complete search history.

(56) References Cited

U.S. PATENT DOCUMENTS

| 4,922,162 A * | 5/1990 | Shiraki et al. ................. 310/268 |
| 6,396,190 B1 * | 5/2002 | Ahn et al. ...................... 310/429 |

(Continued)

FOREIGN PATENT DOCUMENTS

| JP | 2009-050136 A | 3/2009 |
| KR | 10-2007-0115249 A | 12/2007 |

(Continued)

*Primary Examiner* — Alex W Mok
(74) *Attorney, Agent, or Firm* — Rabin & Berdo, P.C.

(57) ABSTRACT

Provided is a BLDC motor for a hair dryer, which includes high strength plastic parts integrated through injection molding. Thus, the number of parts is decreased to thereby decrease manufacturing costs and the weight of the BLDC motor. Furthermore, a sirocco fan installed in the BLDC motor is directly coupled to an outer circumferential surface of a rotor housing so as to optimize an assembling structure of the sirocco fan, thereby stabilizing the rotation thereof. Accordingly, vibration and noise due to rotation can be reduced, and an amount of introduced air can be maximized. To this end, the BLDC motor includes a rotor housing including permanent magnets on an inner surface thereof, and a shaft hole in a central portion thereof to receive a shaft, wherein a sirocco fan for blowing air is coupled to an outer portion of the rotor housing, a rotor frame coupling the shaft to the rotor housing to integrally rotate them, a stator core around which a coil is wound to interact with a magnetic field formed on the permanent magnets, thereby generating torque, a PCB coupled to a lower portion of the stator core by a screw, a base bracket including a support protrusion on an upper outer portion thereof to support the stator core, and a bearing housing coupled to an upper portion of the base bracket to support a ball bearing, and including a removal prevention protrusion in a lower outer portion thereof to prevent removal of the stator core.

10 Claims, 7 Drawing Sheets

(56) References Cited

U.S. PATENT DOCUMENTS

| | | | |
|---|---|---|---|
| 7,012,346 B2* | 3/2006 | Hoffman et al. | 310/43 |
| 2007/0114863 A1* | 5/2007 | Shimoyama et al. | 310/90 |
| 2007/0205682 A1* | 9/2007 | Choi et al. | 310/114 |
| 2008/0116753 A1* | 5/2008 | Carlucci | 310/50 |
| 2008/0131274 A1* | 6/2008 | Kim et al. | 415/204 |
| 2008/0252154 A1* | 10/2008 | Yamashita | 310/51 |
| 2008/0302120 A1* | 12/2008 | Kang et al. | 62/259.1 |
| 2009/0047148 A1 | 2/2009 | Chen et al. | |
| 2009/0056103 A1* | 3/2009 | Fukumaru et al. | 29/596 |
| 2009/0224618 A1* | 9/2009 | Bhatti | 310/90 |
| 2009/0230799 A1* | 9/2009 | Horng et al. | 310/90 |
| 2009/0261672 A1* | 10/2009 | Horng et al. | 310/90 |
| 2009/0309438 A1* | 12/2009 | Horng et al. | 310/90 |
| 2010/0054965 A1* | 3/2010 | Teshima et al. | 417/354 |

FOREIGN PATENT DOCUMENTS

| | | |
|---|---|---|
| KR | 10-2009-0005460 A | 1/2009 |
| KR | 10-2009-0105239 A | 10/2009 |
| KR | 10-0935158 B1 | 12/2009 |

* cited by examiner

BLDC MOTOR FOR A HAIRDRYER

TECHNICAL FIELD

The present invention relates to a brushless direct current (BLDC) motor for a hair dryer, and a sirocco fan installed in the BLDC motor, and more particularly, to a BLDC motor for a hair dryer, which includes light weight inner parts partially integrated through injection molding, thereby entirely decreasing the weight thereof. Furthermore, a sirocco fan installed in the BLDC motor is directly coupled to an outer circumferential surface of a rotor housing so as to optimize an assembling structure of the sirocco fan, thereby stabilizing the rotation thereof. Accordingly, vibration and noise due to rotation can be reduced, and an amount of introduced air can be maximized.

BACKGROUND ART

Hair dryers, which are electric devices for drying an object, include a heater therein to heat air, and a fan motor for forcibly blowing the heated air, thereby conveniently drying a human hair or other wet objects. Thus, hair dryers are widely used for home and commercial purposes.

Such a hair dryer may include a brushless direct current (BLDC) motor that is a direct current (DC) motor having no brush and uses a semiconductor device to control current. Since BLDC motors do not require a brush, the service life thereof is long. In addition, since BLDC motors output high torque, they can rotate at high speed. Furthermore, since the control of current at a motor driver circuit is facilitated, speed of a BLDC motor can be efficiently controlled.

An example of such BLDC motors is disclosed in Korean Patent Registration No. 0935158, titled "ROTOR FAN COUPLING APPARATUS OF BLDC MOTOR FOR HAIR DRYER", which has been filed by the present applicant and has been registered.

The BLDC motor includes: a fan main body including a plurality of rotor blades at a rotor fan part thereof; a rotor housing inserted in an inner surface of the fan main body; a rotor frame coupled to the fan main body, the rotor housing, and a rotation shaft; and a fan fixing spring fixedly connecting the fan main body and the rotor frame to each other. Accordingly, the rotor fan part is indirectly coupled to a motor part of the BLDC motor, and thus, the rotor fan part can be coupled and decoupled more easily and efficiently.

However, referring to FIG. 1, such a BLDC motor 20 for a hair dryer includes separately formed inner parts such as a bracket 400, a bearing housing 110, a printed circuit board (PCB) 300, and a stator 130. Thus, separate coupling members are required to assemble them. In addition, since most of parts are formed of metals, the total weight of the BLDC motor 20 is increased, and thus is inconvenient to use.

Furthermore, a sirocco fan installed on a shaft fan of a typical BLDC motor to forcibly blow air is coupled to a rotor housing through a pin, or is coupled to the central portion thereof, and thus, may be unstably rotated.

DISCLOSURE OF THE INVENTION

Technical Problem

Accordingly, the present invention is directed to a BLDC motor that substantially obviates one or more of the problems due to limitations and disadvantages of the related art. Embodiments provide a BLDC motor having an integrated and light-weighted structure, thereby improving assembling efficiency, and minimizing a defective rate of parts. Furthermore, a sirocco fan installed in the BLDC motor is directly coupled to an outer circumferential surface of a rotor housing so as to optimize an assembling structure of the sirocco fan, thereby stabilizing the rotation thereof. Accordingly, vibration and noise due to rotation can be reduced, and an amount of introduced air can be maximized.

Technical Solution

An object of the present invention is to provide a BLDC motor including: a rotor housing including permanent magnets on an inner surface thereof, and a shaft hole in a central portion thereof to receive a shaft, wherein a sirocco fan for blowing air is coupled to an outer portion of the rotor housing; a rotor frame coupling the shaft to the rotor housing to integrally rotate them; a stator core around which a coil is wound to interact with a magnetic field formed on the permanent magnets, thereby generating torque; a PCB coupled to a lower portion of the stator core by a screw; a base bracket including a support protrusion on an upper outer portion thereof to support the stator core; and a bearing housing coupled to an upper portion of the base bracket to support a ball bearing, and including a removal prevention protrusion in a lower outer portion thereof to prevent removal of the stator core.

A bolt coupling recess may be disposed on the support protrusion of the base bracket, and a bolt coupling hole may pass through the bearing housing to correspond to the bolt coupling recess such that a bolt passes through the bolt coupling hole.

The sirocco fan may include: a plurality of fan blades having a curved shape and spaced a constant distance from one another along a circular shape; a housing coupling ring disposed around an inner circumference defined by the fan blades, to couple to the rotor housing; and an auxiliary fan connecting the housing coupling ring to the fan blades.

Advantageous Effects

According to embodiments of the present invention, a BLDC motor includes high strength plastic parts integrated through injection molding. Thus, the number of parts is decreased to thereby decrease manufacturing costs, and the weight of the BLDC motor is decreased to thereby improve use convenience of a hair dryer.

In addition, a support protrusion and a removal prevention protrusion are disposed in a coupling portion between a base bracket and a bearing housing, to thereby stably support a stator core. Thus, an inner diameter of the stator core is decreased, and a winding width of a coil is increased, thus maximizing efficiency of the BLDC motor.

In addition, an auxiliary fan functioning as a turbo fan is integrated into a sirocco fan of the BLDC motor, thereby decreasing energy consumption and noises. In addition, a housing coupling ring for coupling to a rotor housing is provided to the sirocco fan, thereby rotating the sirocco fan more stably.

MODE FOR CARRYING OUT THE INVENTION

Hereinafter, a brushless direct current (BLDC) motor according to an exemplary embodiment of the present invention will now be described in detail with reference to FIGS. 2 to 10.

Figure 1:
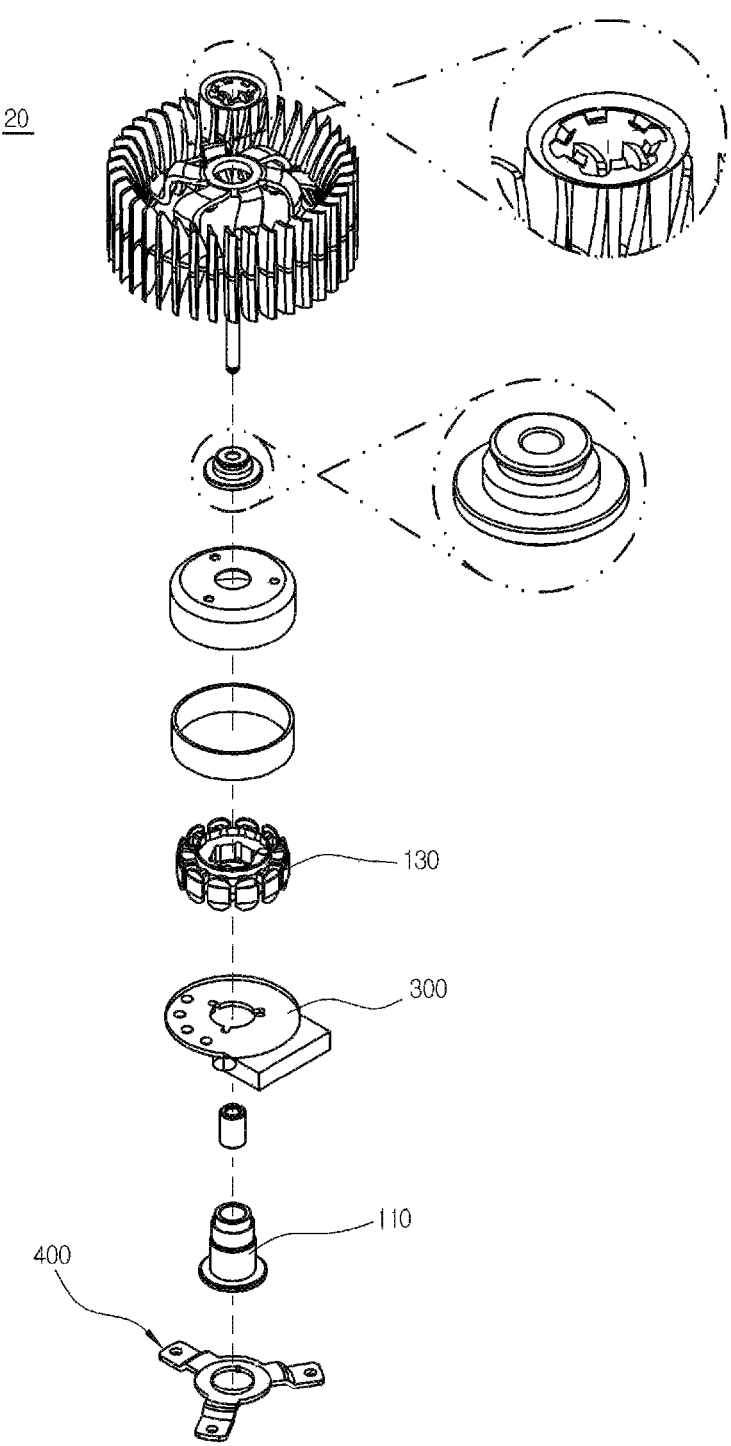
FIG. 1 is an exploded perspective view illustrating a driving part of a BLDC motor in the related art.
Figure 2:
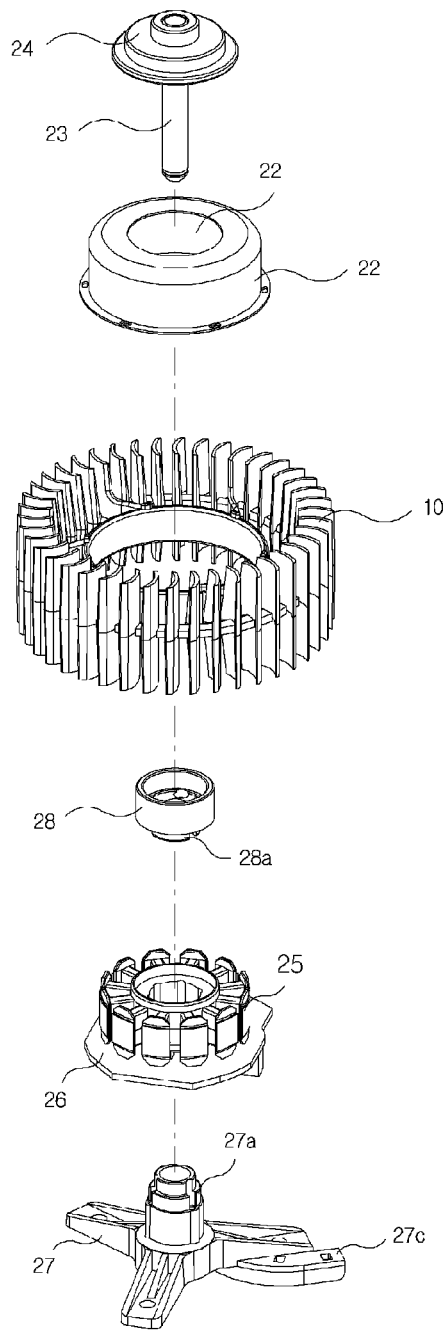
FIG. 2 is an exploded perspective view illustrating a BLDC motor according to an embodiment of the present invention.
Figure 3:
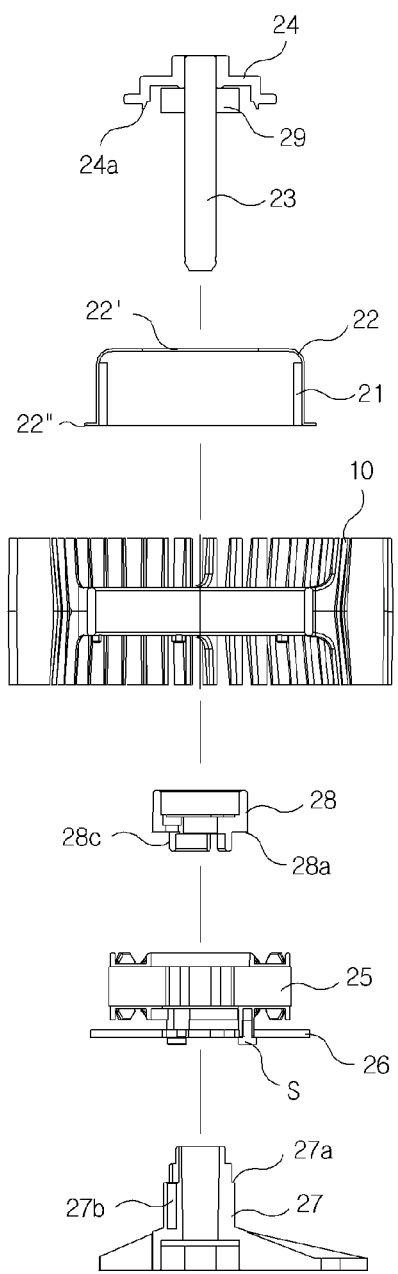
FIG. 3 is an exploded cross-sectional view illustrating the BLDC motor of FIG. 2.
Figure 4:
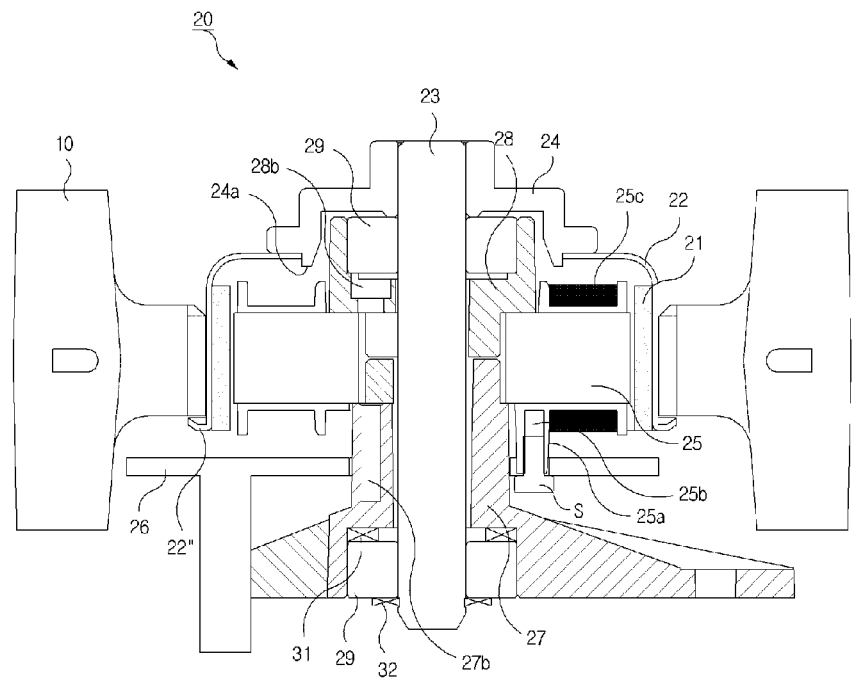
FIG. 4 is a cross-sectional view illustrating the BLDC motor of FIG. 2.

FIG. 2 is an exploded perspective view illustrating a BLDC motor according to an embodiment of the present invention. FIG. 3 is an exploded cross-sectional view illustrating the BLDC motor of FIG. 2. FIG. 4 is a cross-sectional view illustrating the BLDC motor of FIG. 2. FIGS. 5 to 10 are views illustrating parts constituting the BLDC motor of FIG. 2.

A BLDC motor 20 for a hair dryer in accordance with the current embodiment includes: a rotor housing 22 having an accommodation space for accommodating a stator core 25, and including permanent magnets 21 on an inner surface thereof, and a shaft hole 22' in the central portion thereof; a rotor frame 24 having an inner circumference integrally coupled to the upper end of a shaft 23 so as to rotate integrally with the shaft 23 coupled to the rotor housing 22; a stator core 25 around which a coil 25c is wound to interact with a magnetic field formed on the permanent magnets 21, thereby generating torque; a printed circuit board (PCB) 26 coupled to the lower portion of the stator core 25; a base bracket 27 disposed within the stator core 25 to fixedly support the stator core 25; and a bearing housing 28.

An assembly of the rotor housing 22, the rotor frame 24, and the shaft 23 may be referred to as a rotor, and an assembly of the coil 25c and the stator core 25 may be referred to as a stator.

A removal prevention protrusion 28a is disposed on the outer lower end of the bearing housing 28 supported by a ball bearing 29 at the upper side, and a support protrusion 27a is disposed on the outer upper end of the base bracket 27 to correspond to the removal prevention protrusion 28a. Thus, the removal prevention protrusion 28a and the support protrusion 27a catch the upper and lower ends of the stator core 25 to stably support the stator core 25 and decrease an inner diameter of the stator core 25. Accordingly, a winding width of the coil 25c is increased, thus increasing efficiency of the BLDC motor 20.

Figure 5:
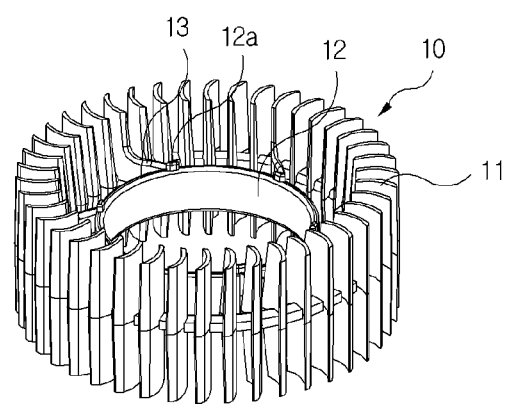
FIG. 5 is a perspective view illustrating a sirocco fan constituting the BLDC motor of FIG. 2.
Figure 6:
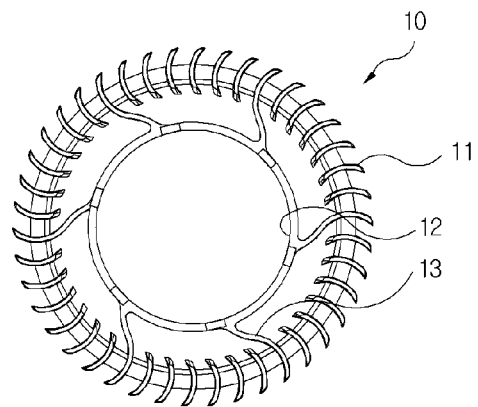
FIG. 6 is a plan view illustrating the sirocco fan of FIG. 5.

Referring to FIGS. 5 and 6, a sirocco fan 10 includes: a plurality of fan blades 11 having a curved shape and coupled to one another with a constant interval along a circular fame; a housing coupling ring 12 disposed around an inner circumference defined by the fan blades 11, to couple to the rotor housing 22; and an auxiliary fan 13 functioning as a turbo fan, and connecting the housing coupling ring 12 to the fan blades 11. The housing coupling ring 12 is in surface contact with an outer circumferential surface of the rotor housing 22. A removal prevention protrusion 22" is disposed on the lower end of the rotor housing 22 to prevent removal of the housing coupling ring 12. A plurality of welding protrusions 12a to be welded to the rotor housing 22 protrude from the lower portion of the housing coupling ring 12, and are spaced a constant distance from one another.

Figure 7:
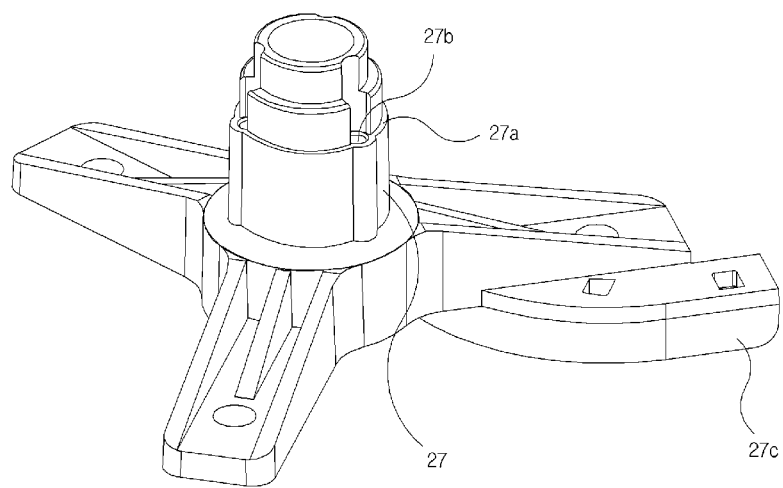
FIG. 7 is a perspective view illustrating a base bracket constituting the BLDC motor of FIG. 2.
Figure 8:
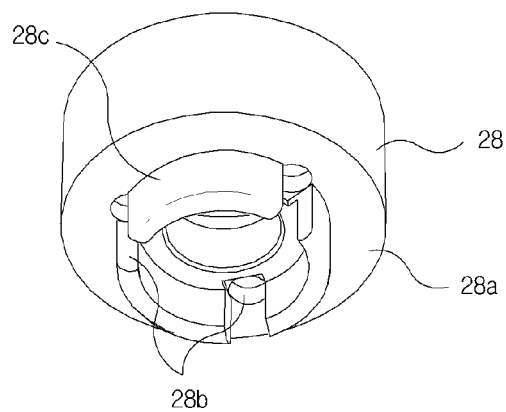
FIG. 8 is a perspective view illustrating the bottom of a bearing housing constituting the BLDC motor of FIG. 2.

The base bracket 27 has an integrated structure of a typical lower bearing housing and a typical bracket, and includes bolt coupling recesses 27b on the support protrusion 27a as illustrated in FIG. 7. Bolt coupling holes 28b pass through the bearing housing 28 to correspond to the bolt coupling recesses 27b such that bolts (not shown) pass through the bolt coupling holes 28b. Referring to FIG. 8, the bolt coupling holes 28b are spaced a constant distance from one another along a guide wall 28c having a certain height from the lower portion of the bearing housing 28. Accordingly, the bolt coupling holes 28b divide the guide wall 28c into a plurality of parts, and thus provide elasticity thereto, so that the inner diameter of the guide wall 28c can be increased or decreased.

A wire guide 27c is integrated into the lower end of the base bracket 27 to guide and cover a wire for supplying power to the coil 25c.

Figure 9:
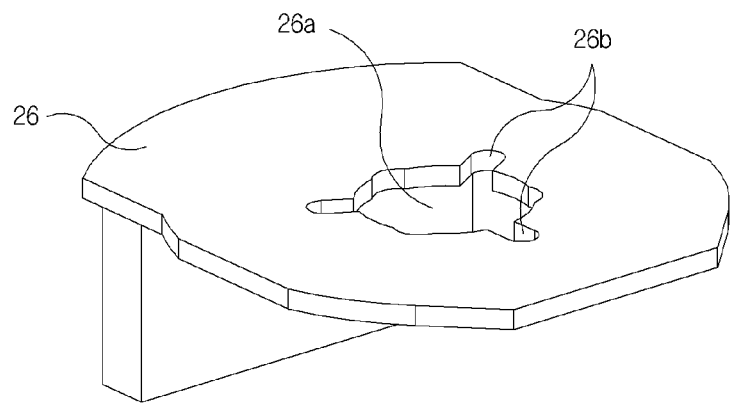
FIG. 9 is a perspective view illustrating a PCB constituting the BLDC motor of FIG. 2.
Figure 10:
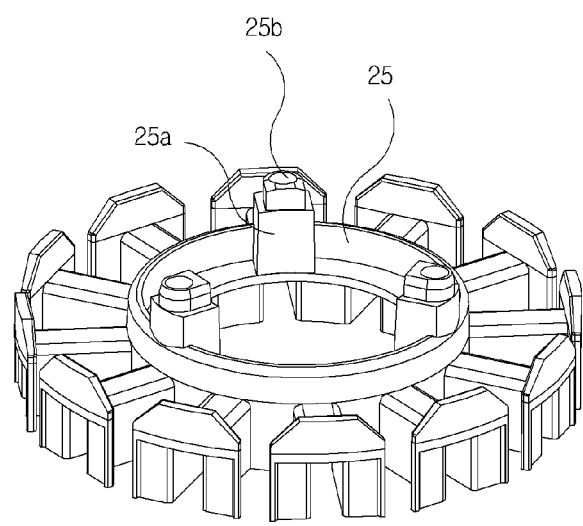
FIG. 10 is a perspective view illustrating the bottom of a stator core constituting the BLDC motor of FIG. 2.

A driving circuit for applying current to the coil 25c, and a pole detecting device such as a hall sensor for sensing a pole of the permanent magnets 21 are mounted on the PCB 26. Referring to FIG. 9, the PCB 26 has a shaft hole 26a to couple to the shaft 23. A plurality of coupling recesses 26b are spaced a constant distance from one another around the shaft hole 26a. Referring to FIG. 10, a plurality of coupling protrusions 25a are disposed on the bottom of the stator core 25 to correspond to the coupling recesses 26b, so that the coupling protrusions 25a can be inserted in the coupling recesses 26b. Screw holes 25b are disposed in the coupling protrusions 25a to couple to screws S for preventing removal of the stator core 25.

Thus, the PCB 26 and the stator core 25 can be stably coupled to each other, and be easily removed from each other.

A compression caulking part 24a protrudes from the rotor frame 24 to couple the rotor frame 24 to the rotor housing 22. Thus, when the BLDC motor 20 is manufactured, a caulking apparatus momentarily compresses the compression caulking part 24a, thereby coupling the rotor frame 24 to the rotor housing 22.

Each of the base bracket 27, the bearing housing 28, and the ball bearing 29 has an integrated structure formed of a light weight polycarbonate material through injection molding, thereby improving integration and decreasing the weight thereof.

A washer 31 and a C-ring 32 stably support the ball bearing 29 and prevent removal thereof.

An operation of a BLDC motor configured as described above will now be described.

First, when the driving circuit mounted on the PCB 26 supplies current to the coil 25c wound around the stator core 25, magnetic flux is generated and transmitted to the permanent magnets 21 around the stator core 25, thereby rotating the rotor housing 22, the rotor frame 24, and the shaft 23. At this point, the pole detecting device installed on the PCB 26 detects poles of the permanent magnets 21, and a signal corresponding to the detected poles is transmitted to the driving circuit of the PCB to supply power for magnetizing the coil 25c with poles different from those of the permanent magnets 21, thereby continually rotating the rotor housing 22, the rotor frame 24, and the shaft 23. Accordingly, the sirocco fan 10 rotates at high speed so as to forcibly blow air from the hair dryer.

During this process, the stator core 25 is stably and fixedly supported by the PCB 26, the base bracket 27, and the bearing housing 28, thereby rotating the rotor housing 22, the rotor frame 24, and the shaft 23 more efficiently.

In addition, each of the base bracket 27, the bearing housing 28, and the ball bearing 29 is formed of a light weight polycarbonate material through injection molding, thereby decreasing the weight thereof.

Accordingly, the BLDC motor 20 has a modularized and light-weighted structure, and the number of parts constituting the BLDC motor 20 is decreased, to thereby decrease manufacturing and assembling costs and simplify manufacturing and assembling processes. Furthermore, since the weight of the BLDC motor 20 is entirely decreased, the number of rotations of the sirocco fan 10 can be increased, thereby maximizing driving efficiency of the BLDC motor 20.

In addition, unlike a typical sirocco fan fixed to a pin or the central portion of a rotor housing, the sirocco fan 10 coupled to the rotor housing 22 is in direct surface contact with the outer circumferential surface of the rotor housing 22 through the housing coupling ring 12. Thus, the sirocco fan 10 can stably rotate, and uniformly and maximally introduce air, and an optimal amount of air can be discharged therefrom. Furthermore, force is applied to a single portion of the sirocco fan 10 so as to prevent energy dispersion and a torque loss of the BLDC motor 20, thereby saving energy.

In addition, since the sirocco fan 10 is uniformly and securely coupled to the rotor housing 22, the sirocco fan 10 can be precisely and constantly rotated without shaking and vibration, thereby decreasing abnormal noises and ensuring optimal performance (with respect to air blow and motor torque).

In addition, since the auxiliary fan 13 functioning as a turbo fan is integrally formed with the inner portion of the sirocco fan 10 so as to introduce a larger amount of air, thereby ensuring higher performance at lower RPM. Thus, energy consumption and noises can be decreased just by the configuration of the sirocco fan 10.

While this invention has been particularly shown and described with reference to exemplified embodiments thereof, it will be understood by those skilled in the art that various changes in form and details may be made therein without departing from the spirit and scope of the invention as defined by the appended claims.

The exemplified embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A brushless direct current (BLDC) motor for a hair dryer, comprising:
   a rotor housing comprising permanent magnets on an inner surface thereof and a shaft hole in a central portion thereof to receive a shaft;
   a sirocco fan coupled to an outer portion of the rotor housing and blowing air;
   a rotor frame having an inner circumference integrally coupled to an upper end of the shaft and an outer circumference coupled to the rotor housing;
   a stator core around which a coil is wound to interact with a magnetic field formed on the permanent magnets, thereby generating torque;
   a printed circuit board (PCB) coupled to a lower portion of the stator core by a screw (S);
   a base bracket including a support protrusion on an upper outer portion thereof to support the stator core;
   a bearing housing coupled to an upper portion of the base bracket to support a ball bearing and including a removal prevention protrusion in a lower outer portion thereof to prevent removal of the stator core;
   a bolt coupling recess disposed on the support protrusion of the base bracket; and
   a bolt coupling hole passing through the bearing housing to correspond to the bolt coupling recess such that a bolt passes through the bolt coupling hole.

2. The BLDC motor of claim 1, further comprising:
   a wire guide integrated into the base bracket to guide a wire for supplying power.

3. The BLDC motor of claim 1, further comprising a plurality of bolt coupling holes, the bolt coupling holes being spaced a constant distance from one another along a guide wall having a certain height from a lower portion of the bearing housing, and dividing the guide wall into a plurality of parts such that an inner diameter of the guide wall is increased or decreased.

4. The BLDC motor of claim 1, wherein
   the PCB has a shaft hole to couple to the shaft,
   a plurality of coupling recesses are spaced a constant distance from one another around the shaft hole,
   a plurality of coupling protrusions are disposed on a bottom of the stator core to correspond to the coupling recesses such that the coupling protrusions are inserted in the coupling recesses, and
   a screw hole is disposed in each of the coupling protrusions to couple to the screw (S) for preventing removal of the stator core.

5. The BLDC motor of claim 1, wherein each of the base bracket, the bearing housing, and the ball bearing has an integrated structure formed of a light weight polycarbonate material through injection molding.

6. The BLDC motor of claim 1, further comprising
   a compression caulking part protruding from the rotor frame to couple the rotor frame to the rotor housing.

7. A brushless direct current (BLDC) motor for a hair dryer, comprising:
   a rotor housing comprising permanent magnets on an inner surface thereof and a shaft hole in a central portion thereof to receive a shaft;
   a sirocco fan coupled to an outer portion of the rotor housing and blowing air;
   a rotor frame having an inner circumference integrally coupled to an upper end of the shaft and an outer circumference coupled to the rotor housing;
   a stator core around which a coil is wound to interact with a magnetic field formed on the permanent magnets, thereby generating torque;
   a printed circuit board (PCB) coupled to a lower portion of the stator core by a screw (S);
   a base bracket including a support protrusion on an upper outer portion thereof to support the stator core; and
   a bearing housing coupled to an upper portion of the base bracket to support a ball bearing and including a removal prevention protrusion in a lower outer portion thereof to prevent removal of the stator core,
   wherein the sirocco fan comprises
      a plurality of fan blades having a curved shape and spaced a constant distance from one another along a circular shape,
      a housing coupling ring disposed around an inner circumference defined by the fan blades, to couple to the rotor housing, and
      an auxiliary fan connecting the housing coupling ring to the fan blades.

8. The BLDC motor of claim 7, wherein the auxiliary fan has a curved shape with a certain curvature to function as a turbo fan.

9. The BLDC motor of claim 7, wherein the housing coupling ring is in surface contact with an outer circumferential surface of the rotor housing, and
  a removal prevention protrusion is disposed on a lower end of the rotor housing to prevent removal of the housing coupling ring.

10. The BLDC motor of claim 7, wherein a plurality of welding protrusions to be welded to the rotor housing protrude from a lower portion of the housing coupling ring, and are spaced a constant distance from one another.

* * * * *